United States Patent [19]
August

[11] Patent Number: 5,787,148
[45] Date of Patent: Jul. 28, 1998

[54] ENHANCED TELECOMMUNICATIONS RELAY SERVICE

[75] Inventor: Katherine Grace August, Matawan, N.J.

[73] Assignee: AT&T Corp., Middletown, N.J.

[21] Appl. No.: 583,144

[22] Filed: Dec. 28, 1995

[51] Int. Cl.$^6$ .......................... H04M 11/00; H04M 3/42; H04M 7/00
[52] U.S. Cl. .................... 379/52; 379/201; 379/221
[58] Field of Search ...................... 375/1, 34, 52, 375/201, 210, 211, 212, 213, 214, 221

[56] References Cited

U.S. PATENT DOCUMENTS

| | | | |
|---|---|---|---|
| 5,163,081 | 11/1992 | Wycherley et al. | 379/52 |
| 5,289,523 | 2/1994 | Vasile et al. | 379/52 |
| 5,463,665 | 10/1995 | Millios et al. | 379/52 |
| 5,559,856 | 9/1996 | Dowens | 379/52 |

Primary Examiner—Paul Loomis

[57] ABSTRACT

In a telephone network, a platform is coupled to a profile database and a telecommunications relay center. A voice telephone or text telephone caller dials a telephone number for a text telephone subscriber. The platform receives the telephone call and generates voice and text prompts for the caller. The platform senses calling equipment type by listening for the caller's response to the prompts. The platform accesses the profile database and retrieves a prioritized sequence of one or more telephone numbers corresponding to activated locations for the text telephone subscriber. If the caller is a text telephone user, the text telephone call is routed by the platform directly to the text telephone subscriber. If the caller is a voice telephone user, the voice telephone call is relayed through the relay center to the text telephone subscriber.

15 Claims, 3 Drawing Sheets

FIG. 3

| | | |
|---|---|---|
| 60 → OFFICE | – | TRS |
| 62 → HOME | – | TRS |
| 64 → ALTERNATE OFFICE | – | TRS |
| 66 → TEXT MAIL | – | TRS |

| | | |
|---|---|---|
| 70 → COLLEAGUE | – | TRS |
| 72 → SECRETARY | – | TRS |
| 74 → MENU | – | TRS |
| 76 → TEXT MAIL | – | TRS |

↙ 68

ENHANCED TELECOMMUNICATIONS RELAY SERVICE

TECHNICAL FIELD

This invention relates to the processing of communications between speaking and hearing impaired persons and individuals who are not speaking and hearing impaired using telecommunications relay service.

BACKGROUND OF THE INVENTION

A telecommunications relay service allows a speaking or hearing impaired person to employ a text telephone for engaging in a communication session over a telephone network with a person who has a conventional voice telephone. Telecommunications relay services are currently provided by having a communications assistant dedicated to each relay session. Over a voice telephone connection the communications assistant reads to the speaking and hearing person text messages that are transmitted to the communications assistant by the speaking or hearing impaired person using the text telephone. Likewise, the communications assistant transcribes and transmits to the speaking or hearing impaired person the text of that which he hears being spoken over the telephone connection by the speaking and hearing person.

A person wanting to place a call to a speaking or hearing impaired individual calls a telephone number for a telecommunications relay service. The calling party gives the telecommunications relay service the telephone number of the speaking or hearing impaired individual in order to establish the telecommunications relay session.

Likewise, a relay service must ordinarily be used for a voice caller to communicate with a text telephone user. Such relay sessions typically only come about after the text telephone user gives the caller, e.g., an acquaintance or business associate, some information about using the relay service, e.g., the relay service's telephone number. The acquaintance or business associate must remember both the telephone number for the relay service and the telephone number for the hearing impaired person at the time they wish to call. The process works, but has numerous shortcomings.

For example, notwithstanding the information imparted to them by the hearing impaired person to be called, voice callers are unfamiliar with the concept of relay services. A voice caller dialing the relay service might be confused when a communications assistant answers; or, he might forget either or both of the numbers necessary for the relay service. Business callers might prefer to call someone who, having one number, is easier to reach.

Also, a text telephone user will often dial the relay center to place a call, unaware that the target of the call is also a text telephone user.

Currently, databases in companies, utilities, schools, hospitals, etc. store telephone numbers, but not special instructions for relay services and secondary numbers. For example, a public utility might call a text telephone user's home number not realizing that a voice call cannot be accepted. Unfortunately, only one field in the public utility database may be available for telephone number contact information and that field might not be large enough for relay service information.

SUMMARY OF THE INVENTION

Text telephone users would like to be able to have a single telephone number to which calls can be made from either voice or text telephone equipment. Such a single, personal telephone number could be given to acquaintances, business associates and other members of the public, e.g., utility companies, credit organizations, etc. It would also be useful in advertising to the public at large.

The present invention enables a text telephone subscriber to have a single telephone number at which he can be reached by both voice and text callers. In particular, voice calls can be completed to the single number through a relay service while text telephones can directly connect thereto. Moreover, at different times calls to the single telephone number may be completed to different destinations so that the same single, personal telephone number may be used for both home and office.

A profile database stores data records, each of which contains a prioritized list of at least one telephone number, for use in routing voice or text calls to the text telephone subscriber. The prioritized list of telephone numbers is stored so that each number of the list is accompanied by the relay service telephone number in memory. The text telephone subscriber can select and activate a specific number, or reprioritize the numbers, at any time.

When a voice or text caller dials the text telephone subscriber's number, the telephone network accesses the profile database to identify an activated telephone number and a stored relay center number. An announcement is played to the caller, instructing and prompting the caller in both voice and text format. The caller's response indicates his available calling equipment.

If it is determined that the caller is a text caller, the text call is connected directly to the text telephone subscriber.

If it is determined that the calling party is a voice caller, the network directs the call to the relay center. The text telephone subscriber's dialable number, or sequence of numbers, is also supplied to the relay center from the profile list. The call is routed to a communications assistant position at the relay center. Additionally, optional instructions can be played to the caller. Upon conclusion of the instructions, the communications assistant (a) is notified that the caller has received instructions and (b) is presented with the number(s) to be dialed, and, optionally, other information that has been derived in the course of routing the call. The relay center attempts to connect to the text telephone subscriber by trying to complete a call to each telephone number in the prioritized list that was previously not tried for this relay session until the relay session is established or there remains no further previously untried telephone numbers in the prioritized list.

Other features and advantages of the invention will become apparent from the following detailed description, taken in conjunction with the accompanying drawing, which illustrates the principles of the invention by way of example.

BRIEF DESCRIPTION OF THE DRAWING

In the drawing:

FIGS. 3 and 4 show representations of exemplary data records stored in a profile database in accordance with the principles of the invention.

DETAILED DESCRIPTION

Figure 1:
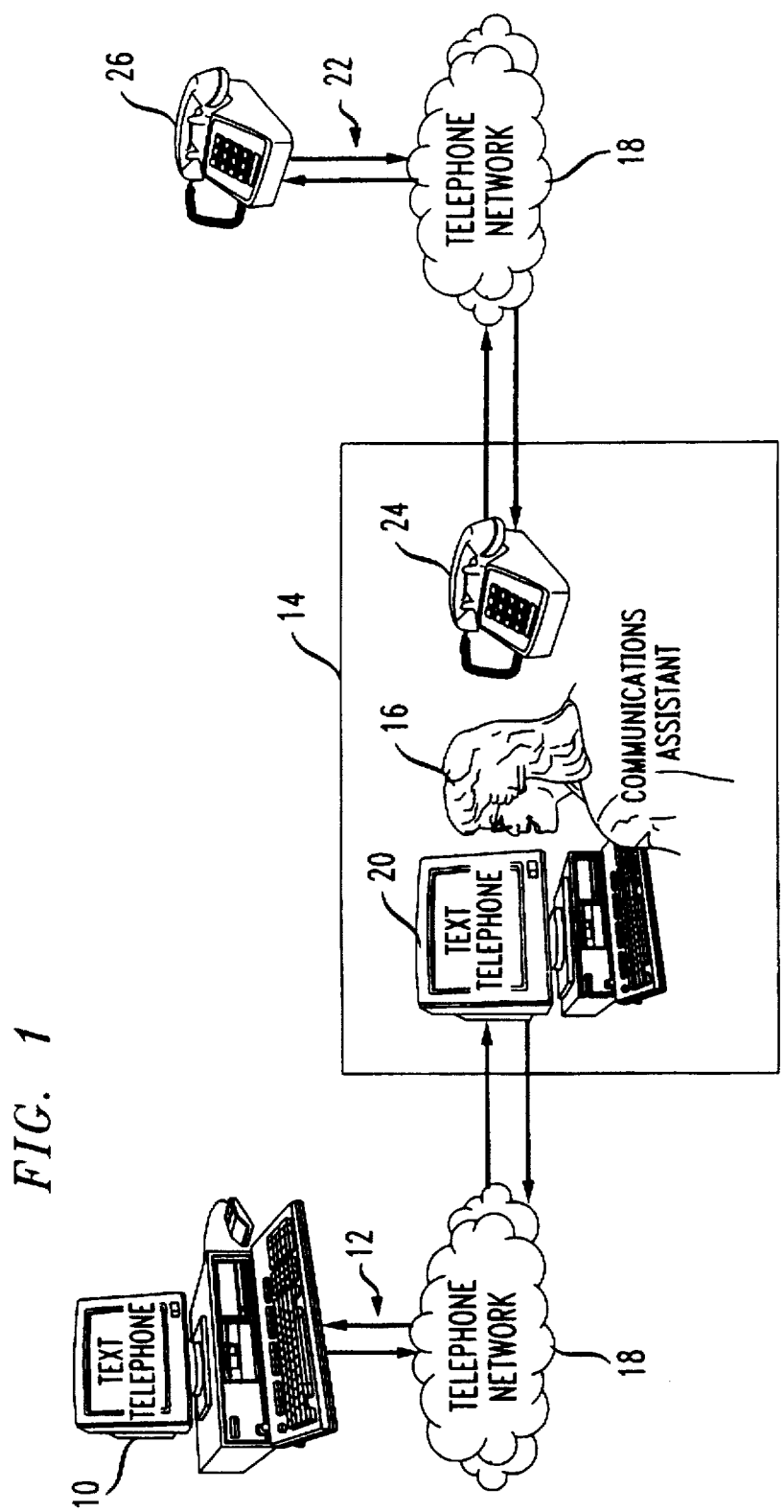
FIG. 1 shows a representation of a telecommunications relay service.

Referring to FIG. 1, a sound impaired person employs a first text telephone 10 to establish a first connection for a communications relay data link 12 with a telecommunications relay service center 14 having a communications assistant ("CA") 16. A "text telephone" is defined to include, by way of example, TTY (teletype), TDD (telecommunications device for the deaf), and ASCII-based devices, as well as personal computers or other means for generating and receiving a text telephone call. The first communications relay data link 12 is established through a telephone network 18. The CA 16 employs a second compatible text telephone 20.

For text to voice relay communications, the CA 16 determines with whom the sound impaired person desires to communicate and establishes a second connection 22 of the communications relay. The second connection 22 is a voice telephone link from a first voice telephone 24 at the CA position to the desired person at a second voice telephone 26.

Communication proceeds by alternating between text communication and voice communication. In text communication, a text message is input to the first text telephone 10 by the sound impaired person. Upon concluding input of the text message, the sound impaired person inputs a predetermined end-of-message code word, such as "GA", which stands for "go ahead", indicating that he has completed his message. The text message appears at the second text telephone 20 operated by the CA. The CA 16 speaks the message into the first voice telephone 24 to relay it to the forward called party so that the message input by the sound impaired person can be heard by the hearing and speaking person at the second voice telephone 26.

When the hearing and speaking person at the second voice telephone 26 hears the code word indicating the end of the message, e.g., "GA" or "go ahead", he begins the second phase of the communications relay by speaking his own message into the second voice telephone 26. The CA 16 hears, via the first voice telephone 24, that which is spoken by the unimpaired person and transcribes it into the second text telephone 20 for transmission to the first text telephone 10. When the unimpaired person has finished speaking his message, he speaks the end-of-message code word. The sound impaired person reads the message, as transcribed by the CA 16, at the first text telephone 10. When he reads the end-of-message code word, the sound impaired person may enter a new message.

The present invention helps a voice telephone or text telephone caller to use a telecommunications relay service center to contact a text telephone subscriber. A calling party wishing to reach the text telephone subscriber through the practice of the present invention is able to dial a single translatable number for the text telephone subscriber, which can be an "800" number.

Figure 2:
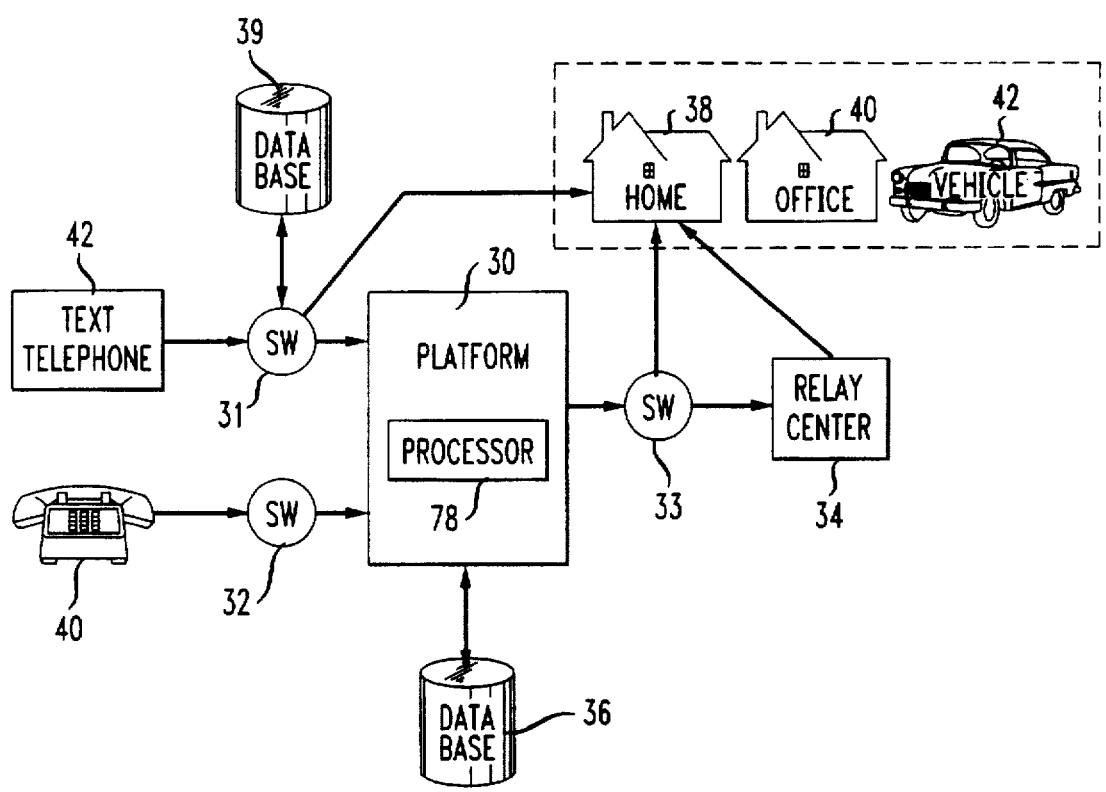
FIG. 2 shows a representation of a platform for routing telephone calls in accordance with the principles of the invention.

Referring to FIG. 2, a platform 30 is coupled through switching systems 31, 32, 33 in a telephone network for accessing, and being accessed by, a telecommunications relay service relay center 34 and a profile database 36. For each text telephone subscriber, a sequence of one or more alternate telephone numbers that each correspond to a location where the text telephone subscriber might be reached, e.g., his home 38, each of his multiple offices 40, and/or vehicle 42, is stored in the profile database 36. The alternate telephone numbers are for dialing in a preselected sequence if a previous number is busy or if there is no answer. The telephone number of the relay center 34 is associated, e.g., in memory, with each alternate number.

The platform 30 is able to determine if the calling party is at a voice telephone 40 or at a text telephone 42 either (a) automatically or (b) by prompting the caller and collecting an indicative form of input such as a baud-0 signal from a text telephone 42. If it is determined that the caller is a text telephone user, the text call is routed by the platform 30 through a switching system 33 directly to each telephone number in the sequence until the call is completed or until there are no previously untried numbers left in the sequence in an attempt to connect the caller to the text telephone subscriber and avoid using the resources of the relay center 34. However, if desired, the text call can be passed through relay center 34 to offer additional service features.

If the calling party is a voice caller, the call is directed by platform 30 to relay center 34, e.g., via electronic switching system 33. The dialable number or sequence of numbers from profile database 36 is also passed to relay center 34. The relay center 34 uses the received number or sequence of numbers to complete a relay session to the text telephone subscriber.

Another embodiment of the invention contemplates that a switching system, such as switching system 31, can be used instead of platform 30. In this embodiment, the telephone call does not have to be routed to platform 30, switching system 31 is able to hold the telephone call and launch queries to database 39 over the signaling network. Database 39 presents for each text telephone subscriber a sequence of one or more alternate telephone numbers that each correspond to a location where the text telephone subscriber might be reached, e.g., home 38, office 40, and/or vehicle 42. In other words database 39 can hold the same records as data-base base 36. The alternate telephone numbers are for dialing in a preselected sequence if a previous number is busy or if there is no answer. The telephone number of relay center 34 can be associated, e.g., in memory, with each alternate number. It can be determined if the calling party is at a voice telephone 40 or at a text telephone 42 either (a) automatically or (b) by prompting the caller and collecting voice or text input. This may be done by switching system 31 in conjunction with database 39. If it is determined that the caller is a text telephone user, the text call is routed directly to each telephone number in the sequence, corresponding, e.g., to locations 38, 40, 42, in an attempt to reach the text telephone subscriber and avoid using the resources of relay center 34. However, if desired, the text call can be passed through platform 30 to offer additional service features.

As noted above, operation of the system generally prevents the routing through relay center 34 of a text telephone call to a text telephone party. To this end, a caller at either a voice telephone or a text telephone may be prompted by operation of platform 30 in the first-described embodiment, or a switching system in conjunction with database 39 in the second-described embodiment, supplying both voice and text prompts. As an example of a voice prompt for a voice telephone caller: "WELCOME. PRESS 1 FOR SERVICE. PRESS 2 FOR BILLING." As an example of a text prompt for a text telephone caller: "WELCOME. PRESS ANY KEY ON YOUR KEYBOARD TO CONTINUE GA".

Based on the nature of the caller's response to the prompt, platform 30 (or a switching system operating in conjunction with database 39) determines an equipment type associated with the call, i.e., voice or text. To perform the determination, platform 30 can include a processor 78, which is configured to recognize specific tones or text signals generated by voice or text equipment and can be enhanced with additional processing equipment to enable recognition of tones and text signals.

If the call is a voice call, the caller is presented with instructions and the voice call is transferred from platform form 30 through electronic switching system 33 to relay center 34 along with a prioritized sequence of telephone numbers for the text telephone party. Such telephone numbers correspond to potential locations of the text telephone subscriber and are arranged according to a predetermined prioritized sequence. At relay center 34, each number in the sequence can be tried automatically and the CA can be brought onto the relay session when the text telephone subscriber is located; or, the sequence may be displayed at the CA's station so that each number of the sequence can be tried in prioritized order by the CA until the telephone call is completed or there remain no previously untried numbers. If the text telephone subscriber answers, a relay session is established between the caller and the destination associated with the sequence telephone number that was answered.

If the call is a text call, platform 30 (or a switching system acting in conjunction with database 39) automatically attempts to reach the text telephone subscriber by connecting to the telephone numbers stored for the text telephone subscriber, according to the prioritized sequence. If the text telephone subscriber answers, then the text call is routed to the destination associated with the telephone number that was answered, without involving relay center 34.

Yet another embodiment of the invention contemplates that a platform and a profile database in accordance with the principles of the invention are disposed within relay center 34. When the single, personal telephone number is dialed, the telephone call is routed through the telephone network to the platform in relay center 34.

Referring to FIG. 3, an exemplary data record 58 activated by a text telephone user stores an office telephone number 60, a home telephone number 62, an alternate office telephone number 64, and a text mail—which is analogous to voice mail—telephone number 66. Referring to FIG. 4, another exemplary data record 68 can include a colleague's telephone number 70, a secretary's telephone number 72, a menu 74 for other options, and a text mail telephone number 76. Note that instead of storing telephone numbers, data records in the profile database could store any identifier of a network point to which a call can be completed.

Advantageously, the present invention (a) allows a text telephone user to have a single telephone number which can be utilized by either a voice telephone caller or a caller using a text telephone; (b) helps a voice telephone caller use a relay center to contact a text telephone user; and, (c) avoids unnecessary redundancy and wasting of relay center resources.

For clarity of explanation, the illustrative embodiments of the present invention are presented as comprising individual functional blocks (including functional blocks labeled as "processors"). The functions these blocks represent may be provided through the use of either shared or dedicated hardware, including, but not limited to, hardware capable of executing software. The functions of processors presented in the Figures may be provided by a single shared processor. Use of the term "processor" should not be construed to refer exclusively to hardware capable of executing software.

While several particular exemplary forms of the invention have been illustrated and described, it will be apparent that various modifications can be made without departing from the spirit and scope of the invention.

What is claimed is:

1. A telecommunications system for use in a telephone network to process communications with a telecommunications relay center, comprising:

a platform for routing a telephone call based on an equipment type for the telephone call; and a profile database for supplying a particular data record which includes at least one potential destination for a text telephone party and information identifying the relay center. wherein the platform includes signal detection circuitry for determining that the call is a voice call, the platform routes the voice call to the relay center, and said at least one potential destination is identified to the relay center in association with said voice call.

2. The invention as defined in claim 1, wherein:

the relay center is operative to automatically complete the voice call as a telecommunications relay session to the text telephone party.

3. The invention as defined in claim 1, wherein:

the relay center is operative to complete the voice call as a telecommunications relay session to the text telephone party upon actuation by a communications assistant.

4. A telecommunications system for use in a telephone network to process communications with a telecommunications relay center, comprising:

a platform for routing a telephone call based on an equipment type for the telephone call; and a profile database for supplying a particular data record which includes at least one potential destination for a text telephone party and information identifying the relay center, wherein:

the platform includes signal detection circuitry for determining that the call is a text call; and the platform operates (i) to access a data record which includes at least one potential destination for the text telephone party, and (ii) to route the text call to said potential destination.

5. The invention as defined in claim 1, wherein:

the profile database includes a plurality of data records, and each of the plurality of data records includes a sequence of numbers for routing the telephone call to the text telephone party and a number for the relay center.

6. A method of routing a telephone call for use in a telephone network which includes a telecommunications relay center, comprising the steps of:

(A) retrieving a prioritized list of potential destinations for a text telephone party in response to the telephone call; and (B) routing the telephone call using the prioritized list, wherein the telephone call can be routed directly to a potential destination for the text telephone party or to said relay center as a function of the type of telephone station originating said telephone call; and further comprising the step of generating a prompt responsive to the telephone call to determine the type of telephone station originating the telephone call.

7. The invention as defined in claim 6, further comprising the steps of:

detecting a voice response to the prompt; and identifying that the telephone call originated from a telephone station configured as a voice telephone station.

8. The invention as defined in claim 6, further comprising the steps of:

detecting a text response to the prompt; and identifying that the telephone call originated from a telephone station configured as a text telephone station.

9. The invention as defined in claim 6, further comprising the steps:

accessing a profile database in response to the telephone call; and retrieving one or more identifiers for use in routing the telephone call.

10. The invention as defined in claim 9, wherein:

the one or more identifiers include a telephone number.

11. The invention as defined in claim 6, further comprising the steps of:

accessing a profile database to retrieve a telephone number for the text telephone party and a number for the relay center;

transferring the telephone call to the relay center; and passing the telephone number to the relay center.

12. A telecommunications system for use in a telephone network to process communications with a telecommunications relay center, comprising:

means for detecting an equipment type used for making a telephone call;

a database; and means for (i) retrieving a data record for routing the telephone call, and (ii) routing the telephone call to a text telephone party based on the equipment type and a record retrieved from the database; wherein the means for detecting includes signal detection circuitry for determining that the telephone call is a voice call.

13. The invention as defined in claim 12, wherein:

the data record includes a number corresponding to a potential destination for the text telephone party.

14. The invention as defined in claim 12, wherein:

the data record includes a sequence of numbers and a number corresponding to the relay center.

15. The invention as defined in claim 12, wherein:

the data record includes at least one potential destination for the text telephone party and a number corresponding to the relay center.

* * * * *